Feb. 9, 1954   C. A. BARNETT   2,668,366
HEAT PROCESSING APPARATUS
Filed Nov. 12, 1949   2 Sheets-Sheet 1
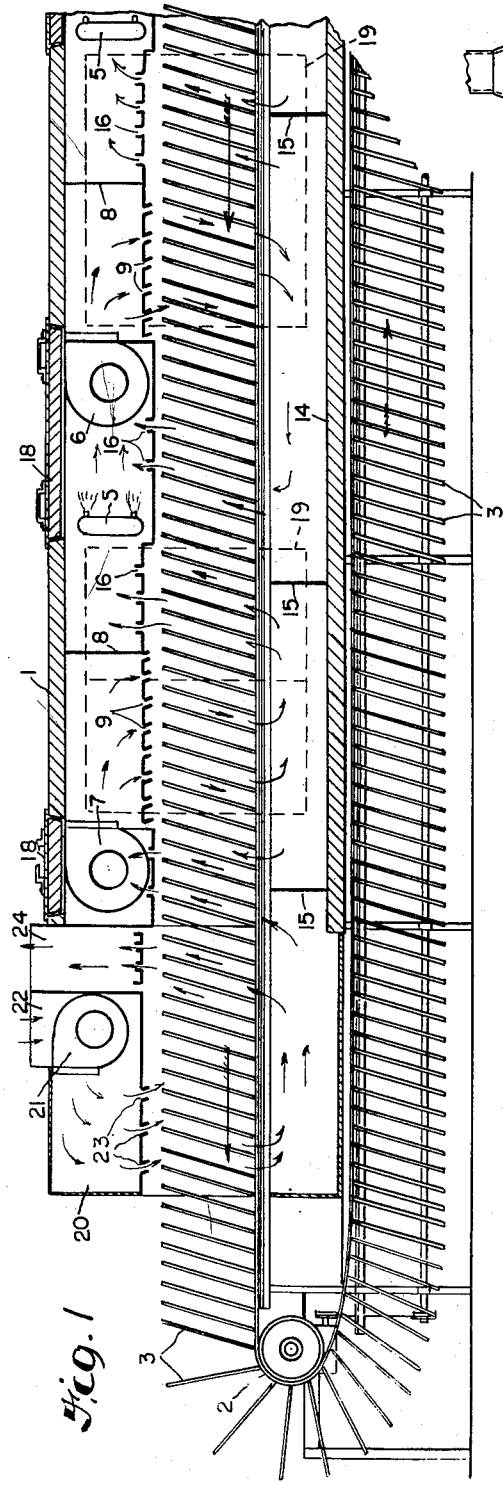
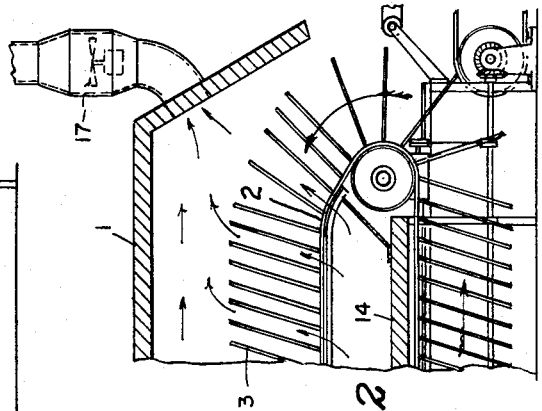
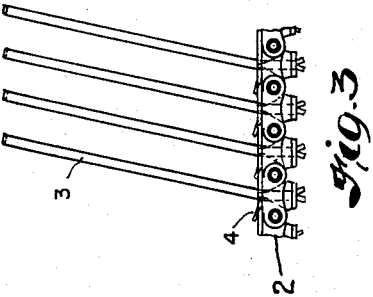
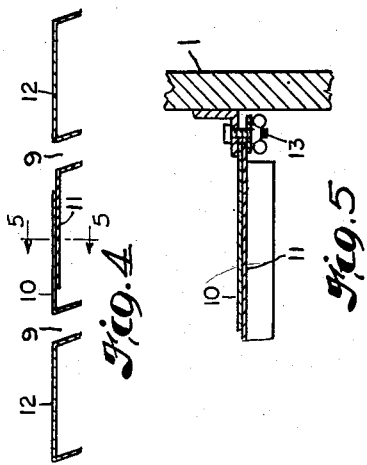
INVENTOR.
CHARLES A. BARNETT
BY
Oberlin + Limbach
ATTORNEYS.

Feb. 9, 1954 C. A. BARNETT 2,668,366
HEAT PROCESSING APPARATUS
Filed Nov. 12, 1949 2 Sheets-Sheet 2

INVENTOR.
CHARLES A. BARNETT
BY
Oberlin & Limbach
ATTORNEYS

Patented Feb. 9, 1954

2,668,366

UNITED STATES PATENT OFFICE 2,668,366

HEAT PROCESSING APPARATUS

Charles A. Barnett, Cleveland, Ohio, assignor to Young Brothers Company, Cleveland, Ohio, a corporation of Michigan Application November 12, 1949, Serial No. 126,891

7 Claims. (Cl. 34—66)

This invention relates, as indicated, to heat processing apparatus or machines, and in particular to conveyor-type heat processing machines.

A conveyor-type heat processing machine suitable for heat processing sheet material, such as lithographic plates, is described in Patent No. 2,406,821 which issued to V. A. Fox under date of September 3, 1946, and the present invention is presented as an improvement of such machine. Although the machine therein disclosed has proved quite satisfactory in use, I have now developed an improved form which is both more efficient and more convenient to operate.

The aforementioned patent discloses an oven through which passes the upper course of a conveyor carrying a plurality of closely spaced racks for supporting sheet material on edge. Burners and blowers are arranged beneath the upper course of the conveyor, the blowers being adapted to direct a blast of heated gases upwardly between the sheet supporting rack flanges and across the sheets. In the operation of machines of this type it is frequently desirable to have access to such burners and blowers for purposes of maintenance and repair, and it is accordingly desirable that the same be as little obstructed by other mechanism as possible. Furthermore, to obtain thorough and uniform drying of large flat work-pieces such as lithographic plates I have found it advantageous to direct the drying medium against the printed surfaces thereof rather than merely past such surfaces.

It is, therefore, one object of this invention to provide, in a heat processing machine of the conveyor type, greater accessibility to the heating means and blowers by arranging them above the upper course of the conveyor, where they will be readily accessible through the upper portion of the oven.

Another object is to provide a heat processing machine of the conveyor type adapted more efficiently to dry lithographic plates and the like so that when delivered at the work exit end of the machine such plates will be completely and uniformly dried.

A further object of my invention is to provide a machine of the type indicated in which the component parts are arranged to facilitate circulation of heated gases upwardly and downwardly as they pass therethrough.

Still another object is to provide means adapted to direct heated gases downwardly against the upwardly inclined faces of the work-pieces and adjustable to regulate the force and velocity of such gases.

Other objects and advantages of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawings:

Fig. 1 is a longitudinal vertical section of a portion of a heat processing machine according to a preferred embodiment of the present invention, including the work exit end thereof;

Fig. 2 is a view similar to Fig. 1, but showing the work entering end and associated mechanism;

Fig. 3 is a side elevation of a portion of the conveyor chain with the work-supporting racks carried thereby;

Fig. 4 is a fragmentary vertical section taken longitudinally of the oven showing several adjustable directional ports, to better illustrate their construction;

Fig. 5 is a sectional view taken along the line 5—5 in Fig. 4;

Figure 6:
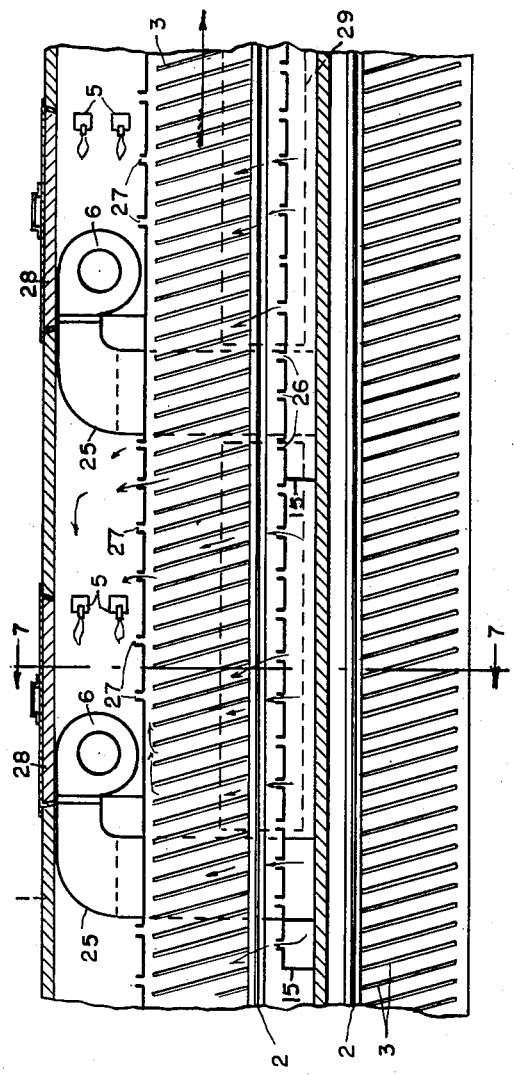
Fig. 6 is a longitudinal vertical section showing the central portion of a modified form of construction of a heat processing machine embodying the principles of my invention.

In the preferred embodiment of my invention illustrated in the drawing I have provided a heat processing machine suitable for drying lithographic plates, masonite or fibre-board sheets and the like comprising an elongated oven having work entering and exit ends, an endless conveyor having an upper course movable longitudinally through the oven, inclined rack members carried by such conveyor in closely spaced relation for supporting sheet material on edge during passage through the oven, a plurality of heating means located in the oven above the upper course of the conveyor, a blower associated with each such heating means likewise located in the oven above the upper course of the conveyor and adapted to discharge heated gases downwardly against and across the sheets of material carried by such racks, and removable covers located in the upper portion of the oven whereby ready access may be had to each heating means and associated blower.

A better understanding of this invention will be had if the operation of the heat processing machine to which this invention relates is explained in conjunction with a description of its construction.

Referring now to the drawing and especially to Figs. 1 and 2 thereof, the machine includes an elongated oven chamber 1 having work entering and exit ends, which are the right and left-hand ends of Figs. 2 and 1, respectively, as viewed in such drawings. The upper portion of the oven is inclined downwardly at the work entering end, thereby to assist in preventing the escape of heated gases into the room. An endless conveyor 2, the respective courses of which are located one above the other, is provided with a plurality of spaced racks 3 at intervals therealong on which sheets of material to be processed are carried. The upper course only of the conveyor passes through the oven, the lower course returning to the work entering end of the oven externally thereof. The racks consist of open frames having a flange or lip 4 at the bottom for supporting sheet material work-pieces on edge and in slightly inclined position. In this manner a very large number of thin flat work-pieces having a large surface area may be processed at one time without damaging the upwardly inclined faces thereof. Sheets of material to be processed are placed on the racks 3 at the work entering end of the oven, or right-hand end as viewed in Fig. 2, and are removed at the left-hand end (Fig. 1). The general flow of gases within the oven is counter to the direction of travel of the material therethrough, i. e., from left to right as viewed in Figs. 1 and 2 of the drawings.

A series of burners 5 and associated blowers 6 is provided above the upper course of the conveyor for heating and circulating gases downwardly between the sheets on their racks. The heating means are shown as gas burners, but other types may obviously be employed. The blowers preferably take the form of one or more conventional electric motor driven fans within suitable volutes, and therefore need not be described in detail. The blower 7, adjacent the work exit end of the oven, has no associated burner and is provided to draw air from a cooling chamber located at the work exit end of the oven, hereinafter more fully described, and circulate the same across the sheets preparatory to their passage through such cooling chamber.

During the operation of the machine, the air discharged by the blower 7 is caused to flow downwardly by the first baffle 8 through directional ports 9 against and across the sheets of material carried by the adjacent racks 3 on the upper course of the conveyor. These ports are located above the upper course of the conveyor and serve to direct air or gases against the upwardly inclined faces of the sheets of material at an angle effective to prevent the sheets from fluttering on their racks. Moreover, the angle of incidence thus obtained provides for more effective heat processing than when the air or gases are passed parallel to the sheets.

As illustrated in Figs. 4 and 5 of the drawing, the directional ports 9 are formed by a series of spaced partitions having parallel inclined downturned flanges forming transverse ports or ducts effective to direct the air or gases to impinge against the inclined sheets or plates, each alternate partition consisting of two adjustable overlapping members 10 and 11, and the remaining partitions consisting of single stationary members 12.

The partitions are shown in Fig. 4 as being relatively thin in cross-section so that the flanged portions thereof may be bent to vary the direction of the gases against the inclined work-pieces. Such flanges, of course, may be provided with hinges to effect such adjustment. By proper adjustment of such ports, so that the flow of gases impinges more or less directly against the sheets, fluttering of the latter may thereby be eliminated.

Members 10 and 11 are carried by side brackets secured to the respective oven walls. A bolt 13 provided with wing nut and washer is adapted to clamp the edges of such members to permit relative adjustment of the latter to alter the width of the ports and thereby to control the velocity of air or gases passing therethrough. Such considerations as the speed of the conveyor and the particular material to be processed will be of importance in selecting the proper port opening.

A horizontal partition 14 forming the bottom of the oven provided with an upwardly extending baffle 15 (or series of such baffles, as may be required) causes the air from the blower 7 to flow upwardly between the racks, through the return ports 16, and into the upper space wherein the corresponding burner 5 and blower 6, nearest the work exit end of the oven, are located. The air is then heated by such burner 5 and the mixture of hot gases and air passes through the corresponding blower 6 and is caused to flow downwardly by the next baffle 8 through further directional ports 9 against and across the sheets of material carried by racks 3. The mixture of gases and air is then caused to flow upwardly between the racks by the combined action of the respective baffle 15, and the suction of the blowers, a portion passing through the return ports 16 back to the same burner and blower for recirculation and a portion being drawn to the next burner and blower in the series. Recycling of a portion of the gases and air by the same association of burner and blower is thus accomplished, the remaining portion being drawn into the next adjacent burner and blower system for reheating and further circulating.

An exhaust fan 17 is located at the work entering end of the oven for the purpose of removing gases from the oven. Although the several burner and blower systems recirculate a portion of the same gases over and over, there will thus be maintained a general flow of gases through the oven as a whole, i. e., from left to right as viewed in Figs. 1 and 2 of the drawing. The exhaust fan is of especial importance where the oven is used for baking solvent vehicles, such as paints and lacquers and the like. Vapors driven off frequently are explosive in nature and the concentration must be kept below the explosive limit to assure safe operation. Likewise where the oven is used for drying purposes the exhaust fan serves the purpose of removing the moisture laden gases. Such fan also keeps the oven under a slight negative pressure so that gases will not escape at the work entering and exit ends. The exhaust fan may be of the bifurcated type as shown in Fig. 2, or may be of the centrifugal type.

Removable covers 18, which may also take the form of hinged access doors, are provided in the upper portion of the oven and located so that ready access may be had to the burners and blowers for the purpose of adjustment, repairs, and the like. Doors 19 are likewise provided along the sides of the oven in order that access may be gained to the interior thereof.

A cooling chamber 20 is provided adjacent the work exit end of the oven wherein is located a blower 21 arranged to circulate unheated air over the sheets of material to cool the same and thereby avoid radiation of heat from the sheets into the room. The air in the cooling chamber is thereby heated prior to being drawn into the oven, and thus a portion of the heat from the sheets is recovered. The air, admitted through inlet 22, is circulated downwardly through directional ports 23, similar in construction to those used within the oven, between the racks, and is directed upwardly by the first baffle 15 at the left-hand end of the oven as viewed in Fig. 1. A portion of such air is then drawn into the oven by the blower 7, as previously described, the remainder leaving the cooling chamber at the exit 24.

The particular means employed to drive the above-described machine and to control and energize the various burners and blowers and also the various control and safety devices employed do not constitute a part of the present invention, and reference may be had to the aforesaid Patent No. 2,406,821 for details of the same.

In Fig. 6 is illustrated a heat processing machine having a modified form of construction. In general, the machine there illustrated is similar to the one previously described, the only change being in regard to the manner of circulation of the gases within the oven. It will be noted, however, that in this figure the conveyor is shown travelling in a direction opposite to the conveyor of Fig. 1, for example.

Figure 7:
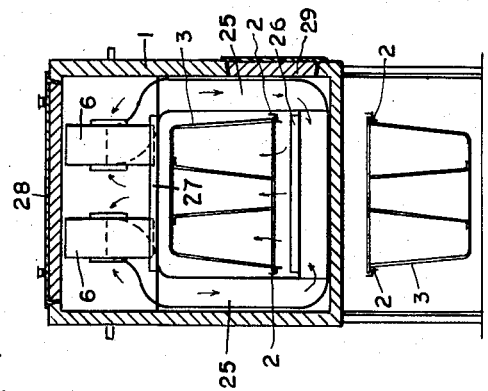
Fig. 7 is a sectional view taken along the line 7—7 in Fig. 6.

Air and gases heated by burners 5 are drawn in by one or more blowers 6, a pair of such blowers shown as being symmetrically disposed above the upper course of the conveyor in Fig. 7, and forced through respective ducts 25 extending downwardly to either side of the conveyor and communicating with the space therebeneath. Through action of baffles 15 such gases are now directed upwardly through adjustable ports 26, across the sheets of material resting on racks 3, and through return ports 27. A portion of the gases will be recirculated by the same association of burner and blower, the remainder moving toward the work entering end of the oven to be reheated and recirculated by adjacent units, as above described, and ultimately to be taken away by the exhaust fan.

The adjustable ports 26 are generally similar in construction to those previously described in connection with the embodiment illustrated in Figs. 1, 4 and 5 but will ordinarily not be inclined at an angle. instead directing the gases more or less directly upwardly. Removable covers or access doors 28 are provided in the upper portion of the oven and located so that ready access may be had to the burners and blowers, and doors 29 are provided along the sides of the oven so that access may be had to the upper course of the conveyor and ports 26.

In regard to the work entering and exit ends of the oven and their respective associated mechanism, such construction is generally similar to that employed in the embodiment previously described, and, for the details of construction of the same, reference may be had to such foregoing description and to Figs. 1 and 2 of the drawings.

The arrangement of burners and blowers above the upper course of the conveyor provides several advantages, one of which being greater accessibility to such elements. Such location of burners and blowers makes them readily accessible for maintenance, adjustment, repairs and the like through the openings provided in the upper portion of the oven.

In regard to the embodiment illustrated in Figs. 1, 2, 4 and 5, more efficient heat processing is obtained since the upper inclined surfaces of the sheets are subjected to the direct flow of heated gases from the blowers, there being no intermediate obstructions as would be encountered were the burners and blowers located beneath the conveyor and adapted to direct the heated gases upwardly between the conveyor chains and rack flanges. The directional ports which are provided above the upper course of the conveyor to direct the heated gases against the sheets permit a stronger flow of such gases to be used without dislodging the sheets or causing them to flutter, likewise providing for more effective heat processing.

With reference to the embodiment illustrated in Figs. 6 and 7, the flow of gases across the sheets is in an upwardly direction only, gases being conveyed to the bottom of the oven by ducts. Such construction has the advantage of requiring less air (hence smaller blowers) to effect the heat processing operation since the air crosses the sheets only once before being reheated, and may therefore be kept at a higher temperature. Such arrangement also provides more uniform temperature distribution permitting more precise temperature control within the oven.

Other modes of applying the principle of the invention may be employed, change being made as regards the details described, provided the features stated in any of the following claims or the equivalent of such be employed.

I therefore particularly point out and distinctly claim as my invention:

1. In a heat processing machine comprising an elongated oven having work entering and exit ends, and a conveyor movable longitudinally therethrough having rack members arranged thereon in spaced apart relation for supporting generally flat work-pieces in inclined position during its travel through such oven; the combination of a plurality of longitudinally spaced heating means located in such oven above the upper course of such conveyor, a plurality of uniformly directed blower means associated with such heating means likewise located in such oven above the upper course of such conveyor and adapted to maintain a general flow of heated gases through such oven in a direction opposite to movement of such conveyor therethrough, a series of transverse baffles longitudinally spaced in such oven to assist in directing the flow of heated gases through the oven, and a series of horizontally disposed transverse partitions arranged in slightly spaced apart relation lengthwise of such oven, each such partition having parallel lateral flanges with adjacent flanges of the several partitions cooperably forming transverse directional ports effective to direct the heated gases into contact with such work-pieces, at least certain of said partitions being of variable lateral extent to permit the size of the ports partially formed thereby to be adjusted.

2. The combination of claim 1 wherein the directional ports are positioned above the upper course of such conveyor and are operative to direct the heated gases downwardly at an angle against such work-pieces thereby to prevent fluttering.

3. The combination of claim 2 wherein the baffles are located in such oven beneath the upper course of such conveyor spaced to redirect such heated gases upwardly for further circulation by such blower means.

4. In a heat processing machine comprising an elongated oven having work entering and exit ends, and a conveyor movable longitudinally therethrough having rack members arranged thereon in spaced apart relation for supporting generally flat work-pieces in inclined position during its travel through such oven; the combination of a plurality of longitudinally spaced heating means located in such oven above the upper course of such conveyor, blowers associated with said heating means likewise located in such oven above the upper course of such conveyor, a duct associated with each said blower adapted to transmit heated gases discharged by said blowers to the bottom of such oven, there to emit such gases, directional ports located in such oven beneath the upper course of such conveyor to direct such heated gases upwardly across the work-pieces thus supported, transverse baffles in such oven between said respective blowers to direct a portion of such gases to the same blowers for recirculation and a portion to adjacent blowers for further circulation, said blowers, directional ports and baffles maintaining a general flow of gases through such oven in a direction opposite to the movement of such conveyor therethrough, and removable covers in the ceiling of such oven whereby ready access may be had to the heating and blower means therein.

5. In a heat processing machine comprising an elongated oven having work entering and exit ends, and a conveyor movable longitudinally therethrough having rack members arranged thereon in spaced apart relation for supporting generally flat work-pieces in inclined position during its travel through such oven; the combination of a plurality of longitudinally spaced heating means located in such oven above the upper course of such conveyor, pairs of blowers associated with said respective heating means likewise located in such oven above the upper course of such conveyor, a series of transverse spaced baffles located in the lower portion of such oven defining a plurality of spaces beneath the upper course of such conveyor, a duct associated with each blower adapted to transmit heated gases discharged by such blowers to the bottom of such oven, the ducts of said respective pairs of blowers communicating with said respective spaces at points intermediate the space-defining baffles thereof, and directional ports in such oven beneath the upper course of such conveyor adapted to direct the flow of heated gases from said spaces upwardly against and across such work-pieces, said blowers, baffles and directional ports maintaining a general flow of gases through such oven in a direction opposite to the movement of such conveyor therethrough.

6. In a heat processing machine comprising an elongated oven having work entering and exit ends, and a conveyor movable longitudinally therethrough having rack members arranged thereon in spaced apart relation for supporting generally flat work-pieces in inclined position during its travel through such oven; the combination of a plurality of longitudinally spaced heating means located in such oven above the upper course of such conveyor, pairs of blowers associated with said respective heating means likewise located in such oven above the upper course of such conveyor, a series of transverse spaced baffles located in the lower portion of such oven defining a plurality of spaces beneath the upper course of such conveyor, a duct associated with each blower adapted to transmit heated gases discharged by such blowers to the bottom of such oven, the ducts of said respective pairs of blowers communicating with said respective spaces at points intermediate the space-defining baffles thereof, first directional ports in such oven beneath the upper course of such conveyor adapted to direct the flow of heated gases from such spaces upwardly against and across such work-pieces, and second directional ports in such oven above the upper course of such conveyor adapted to direct such gases upwardly from such work-pieces to such blowers, said blowers, baffles and directional ports maintaining a general flow of gases through such oven in a direction opposite to the movement of such conveyor therethrough.

7. In a heat processing machine comprising an elongated oven having work entering and exit ends, and a conveyor movable longitudinally therethrough having rack members arranged thereon in spaced apart relation for supporting generally flat work-pieces in inclined position during its travel through such oven; the combination of a cooling chamber located at the work exit end of such oven adapted to pass cooling gases over such work-pieces, a first blower in such oven located above the upper course of such conveyor and adapted to further circulate a portion of the gases from such cooling chamber, second and third blowers longitudinally spaced in such oven above the upper course of such conveyor, heating means associated with said second and third blowers operative to heat the gases drawn therethrough, a duct associated with each of said second and third blowers adapted to transmit gases discharged by such second and third blowers to the bottom of such oven, there to emit such gases, directional ports located in such oven beneath the upper course of such conveyor to direct gases emitted by such ducts upwardly across the work-pieces thus supported, transverse baffles located in such oven beneath the upper course of such conveyor spaced to direct a portion of the discharge from each such blower to the same blower for recirculation and a portion for further circulation through such oven, exhaust means located at the work entering end of the oven, said blowers, directional ports, baffles and exhaust means maintaining a general flow of gases from such work exit end to such work entering end, and removable covers in the ceiling of such oven whereby ready access may be had to the blowers and heating means therein.

CHARLES A. BARNETT.

References Cited in the file of this patent

UNITED STATES PATENTS

| Number | Name | Date |
|---|---|---|
| 1,668,995 | Woolever | May 8, 1928 |
| 1,888,573 | Sadwith | Nov. 22, 1932 |
| 1,939,016 | Mutscher | Dec. 12, 1933 |
| 1,980,163 | Belcher | Nov. 13, 1934 |
| 1,994,220 | Hormel | Mar. 12, 1935 |
| 2,318,511 | McAllister | May 4, 1943 |
| 2,326,115 | Arthur | Aug. 10, 1943 |
| 2,364,080 | Kruse | Dec. 5, 1944 |
| 2,406,821 | Fox | Sept. 3, 1946 |

FOREIGN PATENTS

| Number | Country | Date |
|---|---|---|
| 307,963 | Germany | Sept. 23, 1918 |
| 689,992 | France | June 3, 1930 |